UNITED STATES PATENT OFFICE.

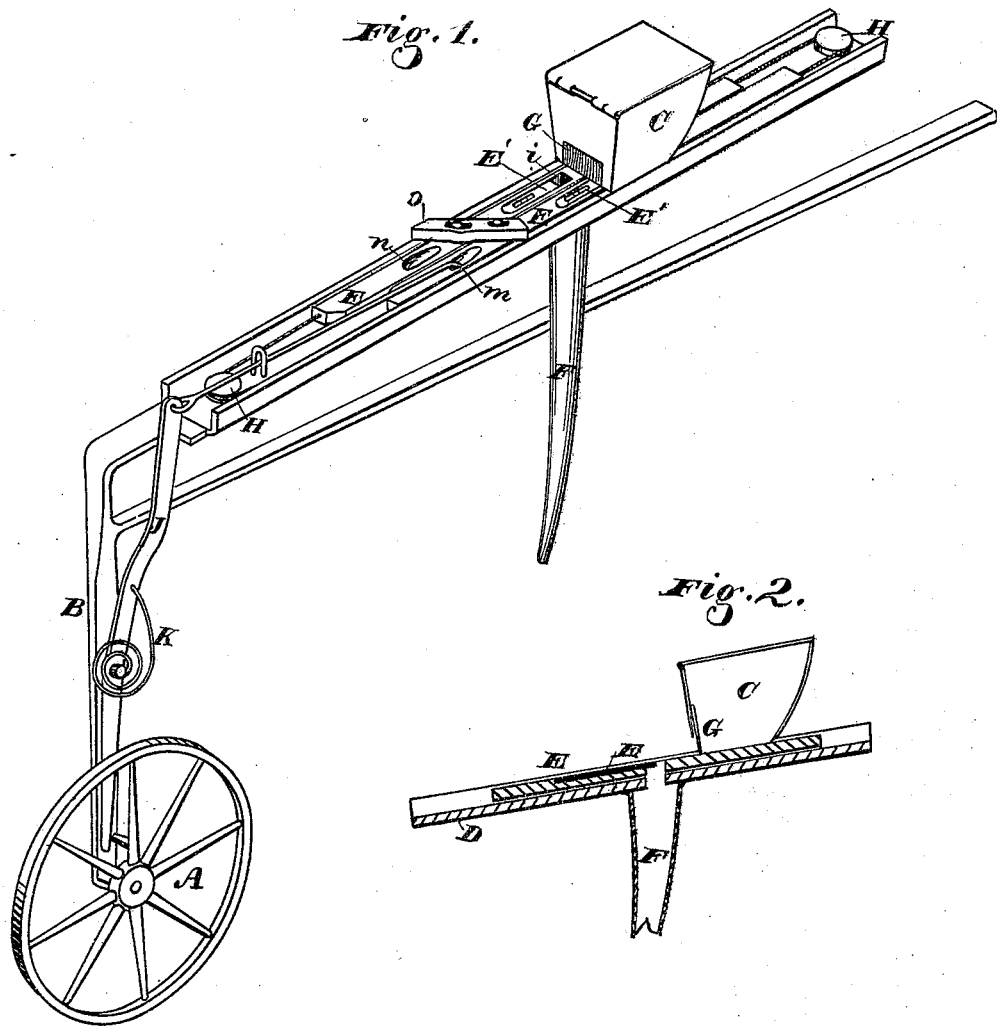

WILLIAM T. EASTERDAY, OF WATSONVILLE, CALIFORNIA.

IMPROVEMENT IN SEED-PLANTERS.

Specification forming part of Letters Patent No. 180,468, dated August 1, 1876; application filed June 2, 1876.

*To all whom it may concern:*

Be it known that I, WILLIAM T. EASTERDAY, of Watsonville, Santa Cruz county, State of California, have invented certain new and useful Improvements in Seed-Planters; and I do hereby declare the following description and accompanying drawings are sufficient to enable any person skilled in the art or science to which it most nearly appertains to make and use my said invention without further invention or experiment.

My invention relates to a novel device for planting corn, pease, beans, or other seeds; and it consists of a double alternating carrier, which takes the seed from the containing-hopper and carries it to the dropping-spout, being actuated from the bearing or traveling wheel by means of a lever and connections, which will be more fully described by referring to the accompanying drawings, in which—

Figure 1 is a perspective view of my seed-planter.

A is a single bearing-wheel, which travels upon the ground and supports the frame B, either alone or with other wheels, according to the construction of the machine. This machine may be drawn over the ground in any suitable manner, and the frame B carries a seed-hopper, C. This hopper is supported upon a long trough or guide, D, between the sides of which two bars, E, are fitted to slide. These bars are of suitable width to just fill the guide, and of a thickness sufficient to allow of a hole or pocket being made in each, which shall contain as much seed as it may be desired to plant in any one spot. These holes $i$ are made at such a point that as the bars E slide forward and back they will carry the pockets alternately beneath the hopper, and thence over the delivery-spout F, so as to discharge the contents of each pocket alternately into the spout. A brush, G, is fitted to the side of the hopper, and as the bars E move beneath it, it will prevent all but just what the pocket contains from passing out, and this device will not break or injure the seeds, as a metallic cut-off would be liable to do. In order to operate the slides alternately I place a pulley, H, at each end of the guide, and unite the ends of the bars or slides by means of wire-rope, chains, or other suitable flexible device, passing around these pulleys, as shown. A lever, J, is pivoted near its middle to the vertical standard B, and the lower end of this lever is drawn back by a pin upon the wheel at each revolution, while the lever is thrown forward by a spring, K. A rod, L, from the upper end of the lever J, extends forward above the slides E, having a hook, $m$, at its end. A hole or slot, $n$, is made in each of the slides E, and the hook L is caused to fall into each of these holes alternately by means of a guide, $o$, which is secured to the two slides by means of pins, which enter slots made in this guide. This guide is a simple straight bar, and when the bars E are caused to slide past each other, it will take an inclined position, first in one direction and then in the other, so that when the lever J is released from the pin upon the wheel, and the spring K throws it forward, the hook $m$ will leave the hole $n$ in one of the slides, and as it moves forward it will be forced to the other side by the guide $o$, so as to drop into the hole $n$ in the other slide. E' are adjustable gages to regulate the size of the seed-openings.

The operation will then be as follows: The machine being drawn over the ground, the wheel A revolves, and the pin upon it comes in contact with the end of the lever J, forcing it forward and drawing the upper end backward, with the rod L and its hook $m$. The hook engages with the hole $n$ in one of the slides E and draws it back, the ropes passing over the pulleys H, causing the other slide to move forward. As the slide is drawn back it withdraws the pocket $i$ from the hopper, passing beneath the brush G, and allows it to discharge its contents into the spout F. When the pin upon the wheel passes and releases the lever J, the spring K throws it forward, and the hook $m$ is transferred to the hole $n$ in the opposite slide E, as before described, so that when the lever is again moved the other slide will be drawn back, the two thus operating alternately.

Having thus described my invention, what I claim as new, and desire to secure by Letters Patent, is—

1. The slides E, moving in a guide beneath the hopper C, and united by cords passing over pulleys H, and having pockets $i$, for receiving the seed from the hopper and carrying it to the delivery-spout by the alternate movements of the slides, substantially as herein specified.

2. The lever J, operated in one direction by a pin upon the driving-wheel, and drawn back by a spring, said lever having a hooked rod, L, in combination with the slides E, with the holes $n$, and the reversible incline $o$, by which the hook $m$ is caused to operate each of the slides alternately, substantially as herein described.

In witness whereof I have hereunto set my hand and seal.

WILLIAM T. EASTERDAY. [L. S.]

Witnesses:
    ZACHEUS CUSHMAN,
    SANFORD JENNING.